Jan. 12, 1960   C. M. MICHALOWSKI ET AL   2,920,361
MIXER-MULLER CONSTRUCTION
Filed June 27, 1957
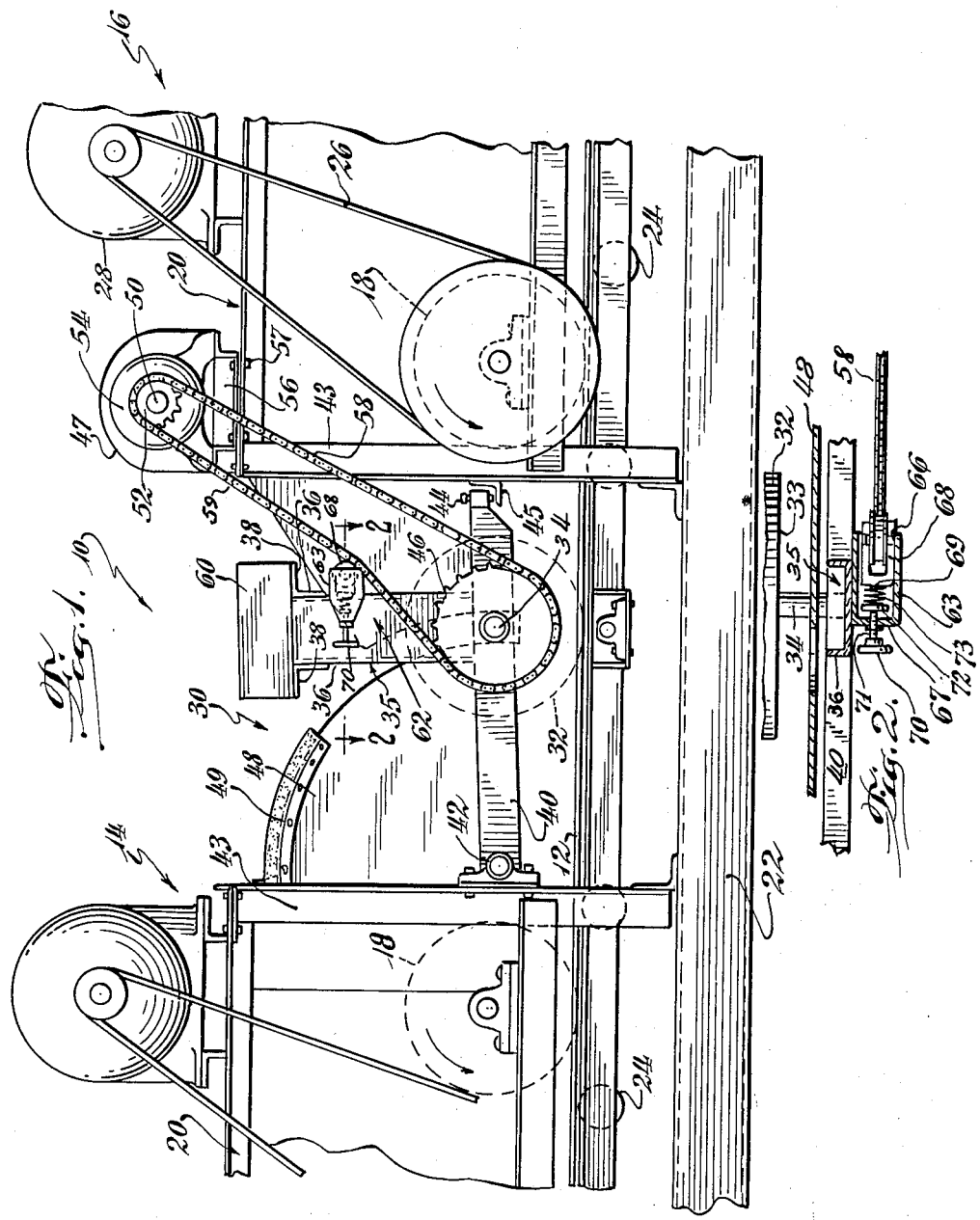
Inventors:
Conrad Michalowski
I- Irving Silverman
By Silverman, Mullin & Cass
Attorneys.

United States Patent Office 2,920,361
Patented Jan. 12, 1960

2,920,361

MIXER-MULLER CONSTRUCTION

Conrad M. Michalowski and I. Irving Silverman, Chicago, Ill., assignors to Pekay Machine & Engineering Co., Inc., Chicago, Ill., a corporation of Illinois Application June 27, 1957, Serial No. 668,456

4 Claims. (Cl. 22—89)

The herein invention relates generally to systems for conditioning granular or pulverulent material such as molding sands used in foundries and more particularly, is concerned with improvements in the mixer-muller structures of such conditioning systems.

In Patent No. 2,610,373, issued September 16, 1952, to J. T. Parisi for a Mixer-Muller, conditioning apparatus for granular material was disclosed in which an agitator or cutter element and muller element were combined with singular advantages, especially for use in foundries. One feature of this invention was the novel association of the muller element with the agitator element whereby the material aerated and fluffed by the agitator was mulled in immediate succession. The electric motor driving the muller wheel was installed on the top of the muller frame so that it lent its additional weight along with said muller frame to the muller wheel during operation thereof. The present invention relates to improvements in the muller apparatus of this combination whereby important and desirable advantages are realized.

It is an important object of the invention to provide a mixer-muller construction of the character described in which the electric motor for driving the muller wheel is installed on an adjacent agitator or mixer stage and means are provided on the muller frame proper to additionally weight the muller wheel.

Another object of the invention is to provide a mixer-muller construction of the character described in which said muller wheel is driven by a flexible drive member and novel means are provided on the muller frame for selectively tensioning said drive member.

The foregoing and other objects of the invention will become apparent as the description of the invention proceeds. A preferred embodiment of the invention has been described in detail in the specification and illustrated in the accompanying drawing. It is contemplated that variations in the specific structure described and illustrated may occur to the skilled artisan which are of such minor character as not to depart from the principles or sacrifice any of the advantages of the invention.

In the drawing:

Fig. 1 is a side elevational view of a section of a conveyor system having conditioning apparatus for granular material stationed therealong, the mixer-muller construction embodying the invention being shown installed as a part of such system.

Fig. 2 is a fragmentary sectional view on an enlarged scale taken through the muller apparatus of the invention along the line 2—2 of Fig. 1 and in the direction indicated.

Referring now to the drawing, the reference character 10 designates generally a section of a conveyor system having a continuous conveyor belt of which the upper reach 12 is shown. Stationed along said reach 12 are individual conditioning apparatuses for mixing and mulling granular material, such as used or new molding sands employed in foundries. As will be understood from said Patent 2,610,373, one end of the conveyor reach might be located beneath a supply hopper (not shown) for the granular material which dumps the material on to the reach for transportation to the conditioning apparatuses. For purposes of explanation of this invention, it may be considered that the reach 12 is moved from left to right in the drawing.

Portions of the mixer stages of the conditioning system 10 are illustrated at 14 and 16 respectively. Each mixer stage includes an agitator or cutter element 18 supported in a box-like framework 20, the framework 20 being secured on elongate support members 22. The reach 12 is supported by suitably mounted idler rollers 24 to pass through said mixer stages. The agitator or cutter elements of each mixer are comprised of helical blades which are rotated by means of the flexible drive member 26 driven from a gear reduced electrical motor 28 mounted on top of the framework 20. It is contemplated that the mixer stage generally is of the same construction as shown in said patent although, for purposes of this invention, it may not be so limited in construction.

The muller stage in which the novel improvements are made is designated generally by the reference character 30. Said stage 30 includes a muller wheel or drum 32 usually formed of stainless steel with end walls 33 and a shaft 34 for supporting the wheel, the ends of the shaft protruding outwardly of the end walls of the wheel 32. The wheel 32 is supported in an upright frame or standard 35 formed of structural members, said frame or standard being generally box-like in configuration. A pair of upright members 36 and horizontal braces 38 secured at the top ends of said members 36 are seen in Fig. 1. The frame or standard is supported at its bottom end on a pair of rocker arms forming part of the frame, one such rocker arm being seen at 40. One end 42 of the rocker arm is pivotally mounted on the uprights 43 of stage 14, the other end having a cap screw 44 threaded therethrough for engagement with the protruding ledge or stop 45 on upright 43 of stage 16 to limit movement of the rocker and permit vertical adjustment of the muller wheel above reach 12.

One protruding end of the shaft 34 carries a sprocket wheel 46 fixed thereon by means of which the shaft is driven for rotating the muller wheel. The shaft ends are suitably journalled in bearings provided on the rocker arms 40 and lateral enclosure plates 48 for the muller stage are mounted between the cutter stages 14 and 16. In Fig. 1, the manner of journalling the ends of the shaft and the structure of the plates 48 and cover member 49 are such as to permit the muller wheel and supporting shaft therefor to be removed as a unit in accordance with the disclosure of the application for patent of J. T. Parisi, Ser. No. 668,965 and filing date of July 1, 1957, of the application referred to, for the invention entitled Conditioner for Pulverulent Material, said application and the herein application being owned by a common assignee. However, such a unique installation is not entirely necessary to this invention.

The muller wheel 32 is driven from a source of rotative power such as the electric motor 47, the shaft 50 of which mounts a sprocket wheel 52. Suitable gear reduction equipment is carried in the housing 54. The motor 47 is carried on a platform 56 which is mounted on the top of framework 20 of the stage 16 by means of the bolts 57. Sprocket wheel 52 is drivingly connected with the sprocket wheel 46 carried on shaft 34 by means of a flexible drive member, such as the sprocket chain 58. It will be noted that the motor is mounted separated from the muller frame 35 on the upper end of an adjacent cutter stage of the system and therefore is freely accessible. In order to additionally weight the muller wheel, we provide a weight of concrete block members or the like shown diagrammatically at 60 carried on top members 38 of the muller frame. The amount of the weight 60 may be varied as desired.

To mount the motor 47 on the adjacent stage 16 it was necessary to increase the length of the drive chain over that employed in the muller apparatus of said patent and to compensate for the up and down movement of the muller wheel. We provide means for controlling the tension of said chain 58 mounted directly on the muller frame 35, said tension control means being designated generally by the reference character 62.

Said means 62 may be seen from Fig. 2 to include a housing 63 secured as by welding to an upright 36 of frame 35. The housing has an open end 66 and an end wall 67 opposite said open end. Reciprocably installed on the interior of said housing is a pressure member 68 designed to bear against a reach 59 of sprocket chain 58 passing adjacent said open end 66. On a side of said pressure member opposite to its engagement with the sprocket chain is a protruding shoulder or seat 69. A manually operable pressure adjustment member 70 has a threaded shank 71 extending through a suitable hole in the wall 67 into the interior of the housing, said shank carrying a disc 72 on the end thereof inside the housing. Between the disc 72 and over said seat 69 is mounted a helical spring 73 arranged to urge the pressure member 68 outward through open end 66 against the adjacent reach of the sprocket chain for adjusting the tension thereof. The manually operable handle 70 carried on the opposite end of said shank exterior of housing 63 enables the tension exerted by spring 73 to be selectively adjusted. Thus, it will be seen that the tightening of the chain 58 which has been substantially elongated by reason of mounting motor 47 on stage 16 is achieved by said means 62 in a very simple and efficient manner merely by manipulating the handle 70.

It will be apparent from the herein invention that servicing of the motor 47 and of the muller 30 is considerably simplified with the motor thus separated from the muller. Nevertheless, the muller wheel is still properly weighted by weight 60 to realize the benefits of such a structure as shown in said patent. The muller 30 likewise may be conveniently positioned in cooperative association with an agitator or cutter stage as contemplated by said patent.

Appended hereto are claims in which the broad principles of the invention have been embodied in suitable terms of structure. In construing the language of said claims it is desired that the most favorable connotation be imparted thereto commensurate with the progress in the arts and sciences contributed by the invention.

What it is desired to secure by Letters Patent of the United States is:

1. In a combination mixer-muller construction for conditioning granular material carried on the upper reach of a driven conveyor through the construction and the mixer includes driven agitator elements for aerating and fluffing the material on the reach, an upright support frame for the elements and motorized equipment for driving said elements on said support frame, muller apparatus positioned to operate on the material after agitation thereof, comprising an upright framework of structural members, a muller roll mounted for rotation in said framework and movable in a vertical plane relative the reach, a motor and drive means including a flexible drive member connected to rotate said muller roll, said motor mounted on the support frame separated from the muller apparatus and additional weighting means mounted on the muller roll framework, said drive member having a variable tension connection with said muller roll to compensate for changes in vertical distance between the muller roll and reach resulting from such movement of the muller roll.

2. In an apparatus for conditioning pulverulent material passing through said apparatus on a continuously moving conveyor member, a framework, beam means having one end thereof pivotally mounted for swinging movement on said framework and having a muller wheel rotatively journalled on said beam means spaced from said pivotal end and adapted to freely ride upon said conveyor member to mull said material as same passes through said apparatus, a standard secured to said beam means and swingable therewith, a weight on said standard, a source of rotative driving power mounted on said framework and spaced above the conveyor member, a flexible drive member extending between said muller wheel and source, and means acting upon said drive member compensating for the variations of distance between said source and muller wheel as said wheel swings up and down during operation thereof.

3. A structure as claimed in claim 2 in which said last means is mounted on said upright.

4. A structure as claimed in claim 2 in which said last means comprises a tensioning device secured to said upright and continuously maintaining tension of said flexible drive member.

References Cited in the file of this patent
UNITED STATES PATENTS

| | | |
|---|---|---|
| 500,579 | Ide | July 4, 1893 |
| 1,704,532 | Curtis | Mar. 5, 1929 |
| 2,267,677 | Baxter | Dec. 23, 1941 |
| 2,315,485 | Jones | Apr. 6, 1943 |
| 2,461,391 | Osterhaus | Feb. 8, 1949 |
| 2,610,373 | Parisi | Sept. 16, 1952 |